May 26, 1925.
J. EDEN
FAUCET
Filed Dec. 12, 1924
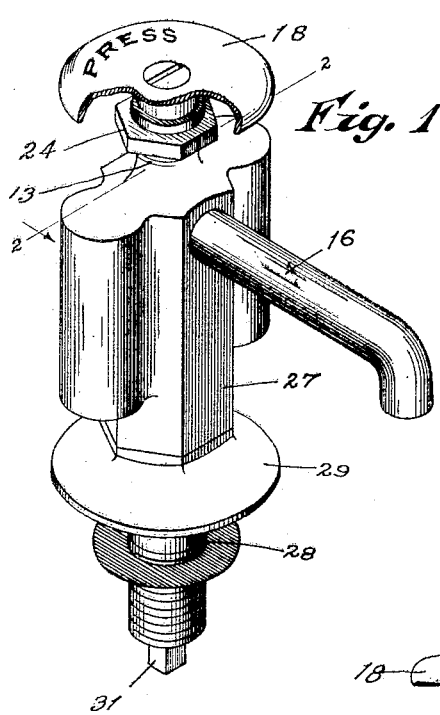
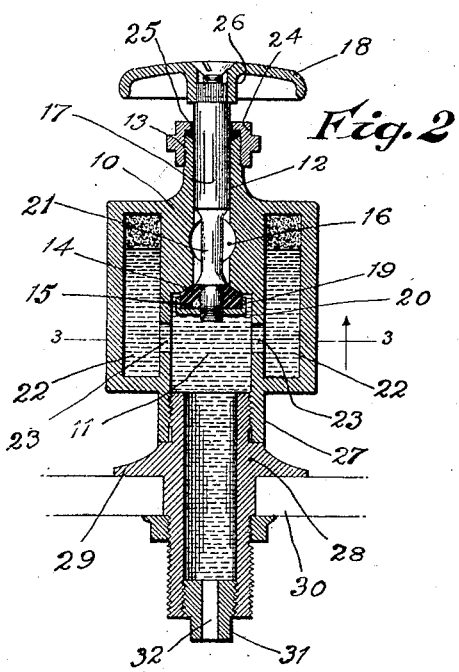
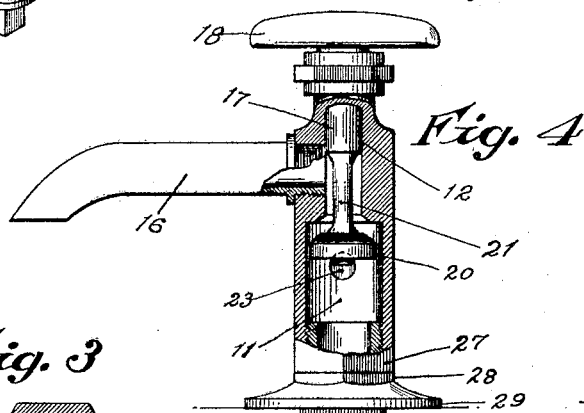
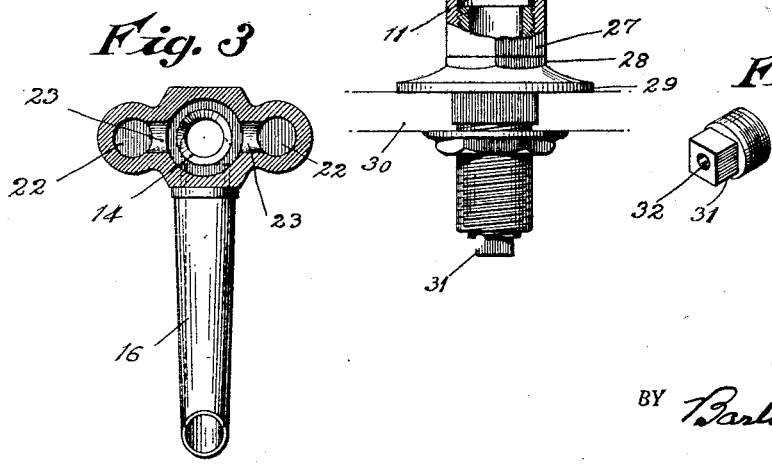
INVENTOR.
John Eden.
BY Barlow & Barlow
ATTORNEYS.

Patented May 26, 1925.

1,539,725

UNITED STATES PATENT OFFICE.

JOHN EDEN, OF ATTLEBORO, MASSACHUSETTS.

FAUCET.

Application filed December 12, 1924. Serial No. 755,458.

*To all whom it may concern:*

Be it known that I, JOHN EDEN, a citizen of the United States, residing at Attleboro, in the county of Bristol and State of Massachusetts, have invented certain new and useful Improvements in Faucets, of which the following is a specification.

This invention relates to an improved construction of self-closing faucet in which the closing of the faucet is effected by water pressure; and the object of this invention is to provide such a faucet of improved construction whereby the same will be automatically closed after having been manually opened, provision being made in the faucet for preventing vibrations of the water column or waterhammer in the supply pipe, due to quick closing of the valve in the faucet.

A further object of this invention is the provision of one or more cushioning chambers which communicate with the pressure-receiving chamber of the faucet, the cushioning chambers being provided with air pockets which act with elastic or cushioning effect to absorb the impulses of the water column when its flow is suddenly arrested to prevent waterhammer in the pipes.

With these and other objects in view, the invention consists of certain novel features of construction, as will be more fully described, and particularly pointed out in the appended claims.

In the accompanying drawings:

Figure 1 is a perspective view of the faucet showing a portion of its operating handle partly broken away.

Figure 2 is a central sectional view of the faucet on line 2—2 of Figure 1, looking towards the discharge opening.

Figure 3 is a section on line 3—3 of Figure 2, looking in the direction of the arrow.

Figure 4 is a side elevation partly in section showing the valve in opened position permitting water to be discharged through the nozzle of the faucet.

Figure 5 is a perspective view of a reducing plug for limiting the flow through the faucet.

It is found in practice in the use of water faucets of the type which remains open until closed by screw action, that often times a great amount of water is wasted by careless operators in leaving the faucet open, and that providing a valve which must be held open to permit the water to flow and which will close automatically when released, reduces the amount of water wasted, to the minimum. It is also found in practice that where a faucet is caused to close automatically by action of water pressure upon it, owing to the quick closing of the valve, waterhammer or vibration in the supply pipe, is often set up and to prevent this waterhammer, I have found that by providing an air cushion in the faucet to absorb these vibrations due to the quick closing of its valve, this waterhammer is prevented; and the following is a detailed description of the present embodiment of my invention, showing one construction of faucet by which these disadvantageous results are prevented:—

With reference to the drawings, 10 designates the body of the faucet, which is provided with a pressure chamber 11 near its lower end, and this body portion is provided with a central bore 12 extending upwardly from the pressure chamber 11 through the upwardly extending neck portion 13 thereof. The lower end of this bore is preferably shaped to provide a seat 14 for the closure valve 15. This body member is also provided with a discharge outlet 16, or nozzle which communicates with the pressure chamber through the lower end of the bore 12.

In this bore, I have mounted a valve stem 17, the upper end being provided with an operating pressure handle or knob 18 and to the lower end is attached a closure valve or member 19 which may be of rubber or other suitable material encased in a metal cup or casing 20, which casing is threaded onto the lower end of the stem 17. This stem is reduced in diameter at 21 to permit the water from the pressure chamber 11 to flow upwardly and out through the discharge nozzle 16.

It is found in practice that where the closure member is moved to shut off the supply of water automatically by pressure of water upon it, it often moves to its seat very rapidly, and to so quickly shut off the flow often sets up a vibration through the column of water, and this vibration or so-called waterhammer will often jar the pipes and cause them to leak, and in order to obviate this very objectionable difficulty, I have provided a pair of chambers 22, one on either side of the main pressure chamber 11, which communicate with the pressure chamber through openings 23, and when the water is admitted into the pressure chamber 11 it flows out through these passageways 23 into the air-filled chambers 22 forcing the air to the top of these chambers, which air then serves as a spring or resilient cushion to absorb the vibrations of the water column and so prevents this waterhammer in the pipes.

In order to prevent leakage through stem 17, I have provided a packing gland 24 which compresses the desired amount of packing 25 about the stem, and this gland by adjustment, also serves the purpose of limiting the inward or opening action of the presser knob 18 as the shoulder 26 of this knob may bring up against the surface of the gland 24, and by adjusting this gland the opening motion of this knob is thereby determined.

The lower portion of this body member is provided with a neck 27 threaded internally and into this is screwed a connection 28 which may be flanged at 29 to fit onto the usual support 30 and this neck portion is herein shown as being provided with a reducing plug 31 which has an opening 32 of a size less than the normal bore of the pipe, whereby when this plug is inserted into the bore of the pipe the flow through the faucet is limited when the valve is open.

My improved faucet is very simple and practical in construction and is effective in its operation and by its use the flow is automatically shut off when released by the hand of the operator and the valve is caused to act quietly as the vibrations of the column of water are absorbed by the cushion in the valve thus causing the faucet to work quietly without the usual waterhammer which such a faucet ordinarily sets up.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A faucet having a main passageway therethrough, air chambers closed at their tops and bottoms and in communication with the main passageway and a valve adapted to close the passageway by a fluid pressure therein.

2. A faucet having a chamber open at both ends, a valve adapted to be seated therein by fluid pressure, a plurality of air chambers closed at their ends and communicating with the first named chamber and means for forcing the valve from its seat against the fluid pressure.

3. A faucet having a conducting chamber, a plurality of air chambers lying parallel thereto and communicating therewith, a valve adapted to close the conducting chamber by fluid pressure within the chamber and means for forcing the valve from closed position against the fluid pressure.

4. A faucet having a chamber open at both ends, a plurality of air chambers closed at their ends, said chambers being intercommunicating intermediate the tops and bottoms thereof, a valve adapted to be seated by fluid pressure in the first named chamber and means for forcing the valve from its seat against the fluid pressure.

In testimony whereof I affix my signature.

JOHN EDEN.